July 16, 1940.  J. A. FUSELLA  2,208,364

REMOTE CONTROL

Filed Jan. 25, 1940  5 Sheets-Sheet 1

INVENTOR
Joseph A. Fusella
BY
ATTORNEY

Fig. 2.

July 16, 1940.　　　　J. A. FUSELLA　　　　2,208,364
REMOTE CONTROL
Filed Jan. 25, 1940　　　　5 Sheets-Sheet 3

Fig. 3.

INVENTOR
Joseph A. Fusella
BY
ATTORNEY

July 16, 1940.  J. A. FUSELLA  2,208,364
REMOTE CONTROL
Filed Jan. 25, 1940      5 Sheets-Sheet 4

INVENTOR
Joseph A. Fusella
BY
ATTORNEY

July 16, 1940.  J. A. FUSELLA  2,208,364
REMOTE CONTROL
Filed Jan. 25, 1940  5 Sheets-Sheet 5

INVENTOR
Joseph A. Fusella
BY
ATTORNEY

Patented July 16, 1940

2,208,364

UNITED STATES PATENT OFFICE 2,208,364

REMOTE CONTROL

Joseph A. Fusella, New York, N. Y.

Application January 25, 1940, Serial No. 315,538

19 Claims. (Cl. 123—179)

This invention relates to new and useful improvements in remote controls, and has specific reference to a remote control for automobiles.

The invention proposes the provision of a device as mentioned which abolishes the manual routine of the starting switch, accelerator pedal, choke, foot brake pedal, brake lever, gear shift lever, clutch pedal, throttle lever and spark advancer, and proposes to transpose these parts from the floor or dashboard of an automobile to a remote place beneath the floor, out of view.

Still further, in one form of the invention it is proposed to adapt the remote control for an automobile having a motor with an ignition system and an accelerator, and also having a brake system, clutch system and speed shift system. It is proposed to provide a manually depressible actuating rod resiliently urged upwards and having a section capable of bending laterally, and to associate certain mechanism with this rod in a way so that when the rod is depressed straight downwards the automobile will be operated in a forward direction, starting from the time that the car is started with the self starter, until the time that the shift goes through the various stages to high speed. It is also contemplated to provide mechanism for driving the car in reverse when the bendable portion of the actuating rod is swung laterally.

More specifically, the invention contemplates the provision of a means for starting the motor in an initially depressed position of the actuating rod.

A further means is also contemplated for operating the clutch system, the speed shift system and brake system, on further depression of the actuating rod to shift from neutral into first, second and third for driving said automobile at various speeds, and stopping when said actuating rod again reaches said initially depressed position.

A means is also proposed for operating said clutch system, speed shift system and brake system on lateral motion of the actuating rod section for driving said automobile in reverse, and stopping when said actuating rod moves up and again reaches said initially depressed position.

The invention also contemplates the provision of releasable means for limiting upward motion of the actuating rod to the initially depressed position, in which the motor will merely idle while the car is stationary with its brakes applied.

The invention further contemplates the provision of a means for breaking the ignition circuit when the actuating rod is in its completely raised position so that the automobile will then be in a position of rest with the motor turned off and the brakes applied.

The invention also contemplates the provision of a signal system for indicating when the shift is in neutral, first, second, third, or reverse.

The invention also proposes to have the signal system include an indication for indicating forward motion and stopping of the automobile.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

The remote control for automobiles, in accordance with this invention, is used in combination with an automobile 20 having a motor with an ignition system and an accelerator for accelerating the motor, and a brake system, clutch system and speed control system. The details of these various parts will not be given in this specification as they form no part of the invention and are generally known to those skilled in the art. At this point it may be well to note that just one embodiment of the remote control system of the automobile will be given in this specification, but it should be borne in mind that those skilled in the art will readily be able to comprehend various modifications of the various apparatus disclosed, which disclosure is merely given by way of example only, and no limitation is intended, the intention being to cover the invention as embodied within the scope of the appended claims.

The remote control includes a manually depressible actuating rod 21 resiliently urged upwards and having a top section 21ª and a bottom section 21ᵇ pivotally connected by a pintle 22 in a manner so that the top section may bend laterally. A spring 23 engages against the bottom of the actuating rod 21 and is contained in a housing 24 and acts between the housing and the actuating rod for resiliently urging the actuating rod upwards. The top end of the actuating rod is connected with certain mechanism by which it may be conveniently manually depressed. Such mechanism includes a foot pedal 25 and a hand lever 26 which may be selectively used or simultaneously used, depending merely upon taste.

Figure 11:
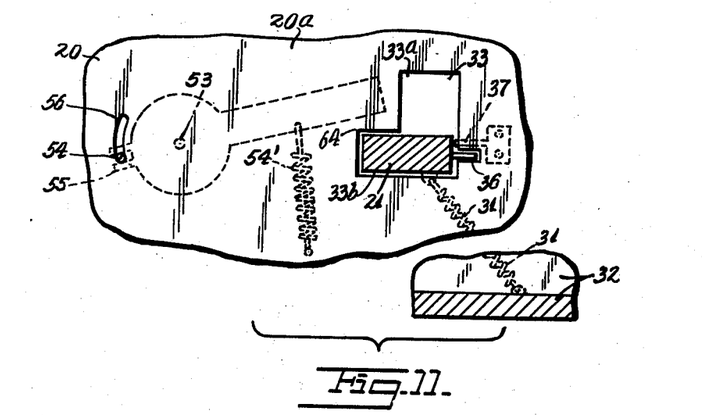
Fig. 11 is a fragmentary horizontal sectional view taken on the line 11—11 of Fig. 2.
Figure 12:
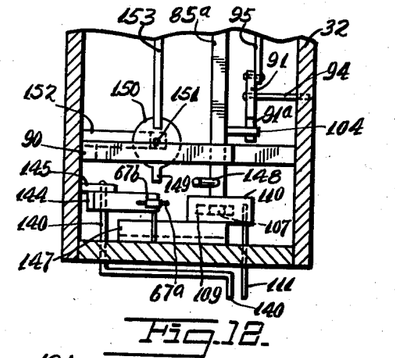
Fig. 12 is a fragmentary horizontal sectional view taken on the line 12—12 of Fig. 8.
Figure 13:
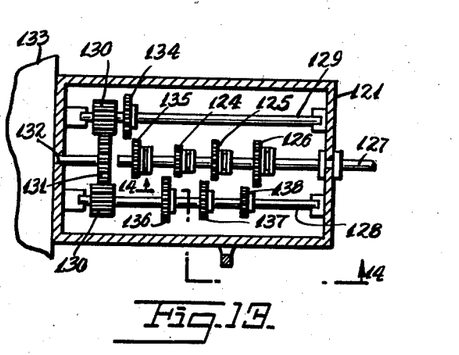
Fig. 13 is a fragmentary horizontal sectional view taken on the line 13—13 of Fig. 1.

The foot pedal 25 is mounted upon the floor 20ª of the automobile. At its rear end the foot pedal 25 is provided with a universal joint 27 by which it is mounted on the floor 20ª in a manner so that the front end may be depressed, or may be swung laterally. A pintle 28 is mounted on the top end of the actuating rod 21 and passes through an elongated slot 29 formed in a lug 30 mounted on the bottom of a front portion of the pedal 25. A spring 31 is connected with the actuating rod 21 and with a casing 32 mounted upon the floor 20ª. This casing 32 houses most of the mechanism for the remote control as may be readily understood by examining the drawings. The actuating rod 21 passes through a slot 33 formed in the floor 20ª. This slot has a laterally extending portion 33ª (see Fig. 11) which permits the actuating rod section 21ª to be swung laterally. The spring 31 serves to maintain the actuating rod section 21ª resiliently in its normal position so that it is free to move laterally.

The upper portion of the actuating rod 21 is provided with a cam portion 21ᶜ which passes through a front section 33ᵇ of the slot 33. This cam portion 21ᶜ normally holds the actuating rod section 21ª from being moved laterally until such time that it is depressed a certain amount. A pin 35 projects from the actuating rod 21 and is aligned to pass through a slot 36 continuing from the rear of the slot 33. A baffle plate 37 is mounted beneath the floor 20ª immediately adjacent the slot 36. This baffle plate 37 has a top cutout portion 37ª. When the pin 35 is intimately above this cutout portion 37ª it may be swung laterally. Once the actuating rod is depressed further, the pin 35 will ride along one side of the baffle plate 37 and then the actuating rod section 21ª cannot be swung laterally.

The handle 26 by which the foot pedal 25 may be controlled with one's hand merely extends upwards so as to be readily grippable. It passes through a standard 38 stationarily mounted on a portion of the automobile 20. The top of the handle 26 extends slightly rearwards to the vicinity of the operator of the vehicle. By this handle 26, the pedal 25 may be depressed by hand power instead of foot power. The standard 38 has sufficient lateral play so that the handle 26 may also be swung slightly laterally so as to swing the foot pedal 25 laterally as already explained. An examination of the drawings will show that various parts are connected with the actuating rod 21, but it should be now understood that there is always sufficient play to permit the actuating rod section 21ª to swing freely laterally. This will become clearer as the specification proceeds.

A means is provided for starting the motor of the automobile 20 in an initial depressed position of the actuating rod 21. This means includes a pawl 39 mounted on the actuating rod 21, and in the said initial position of depression of the actuating rod, strikes a lever 40. This lever 40 is pivotally supported intermediate of its ends on a pintle 41 supported on a bracket 42 mounted on the casing 32. The connecting ends 40ª and 39ª of the lever 40 and pawl 39 are beveled to facilitate engagement of these parts in a way so that the lever 40 will be moved clockwise as the pawl strikes and moves it. The lever 40 has a front section 40ᵇ which is connected with the rear section by a hinge 43. The hinge is so arranged as to be capable of flexing upwards only. With this arrangement when the pawl 39 moves downwards the lever 40 will pivot anticlockwise until the pawl passes the lever, and drops the lever, whereupon the lever will be returned to its original position by a spring 44. When the actuating rod 21 moves upwards the pawl 39 will again strike the lever 40, but this time the front end 40ᵇ will pivot upwards and the lever 40 is not affected.

A switch 45 is supported on a bar 46 immediately beneath the front end of the lever 41. This switch is intended to be connected with the starting motor of the automobile in the usual way. The switch 45 is only closed when the front end of the lever 41 is depressed by the pawl 39. The rear end of the lever 40 connects with a cable 46' which is suitably guided in a bracket 47 and which extends through a guiding tube 48 and which connects with the choke of the automobile motor. Another cable 49 is also connected with the rear end of the lever 40 and extends through a tube 50 and is suitably guided by a bracket 51. The cable 49 connects with the spark advance mechanism of the ignition system of the automobile motor. The arrangement is such that when the bolt 39 pivots the lever 40 clockwise the spark will be advanced and the choke will be open to assist in a quick starting of the motor. This operation is simultaneous with the closing of the starter switch 45. At this point the pin 35 is disposed in line with the cutout 37ª of the baffle plate 37. A means is provided for holding the actuating rod 21 in this initially depressed condition so that the automobile is in a state where the motor is idling; but the automobile is stationary with the brakes on, as hereinafter more fully described.

The means for holding the actuating rod 21 in this depressed condition includes a stop finger 52 which is pivotally supported by a pintle 53 on the bottom of the floor 20ª in the vicinity of the actuating rod 21. A spring 54' acts between the stop finger 52 and the floor 20ª for urging the stop finger into a position across the slot portion 33ᵇ. In this position, the stop finger 52 will extend across the top shoulder 21ᶜᶜ of the cam 21ᶜ and so the actuating rod 21 will be held against coming up above this initially depressed point.

Figure 4:
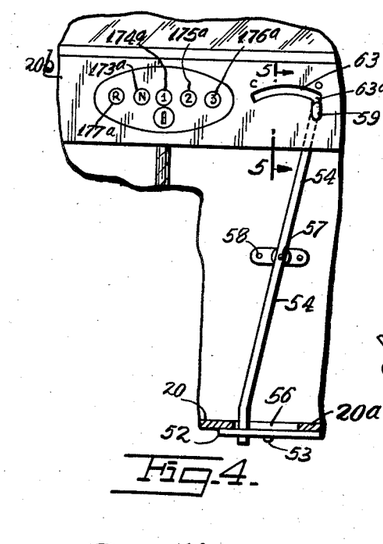
Fig. 4 is a fragmentary elevational view looking in the direction of the line 4—4 of Fig 1.
Figures 5, 6, 7:
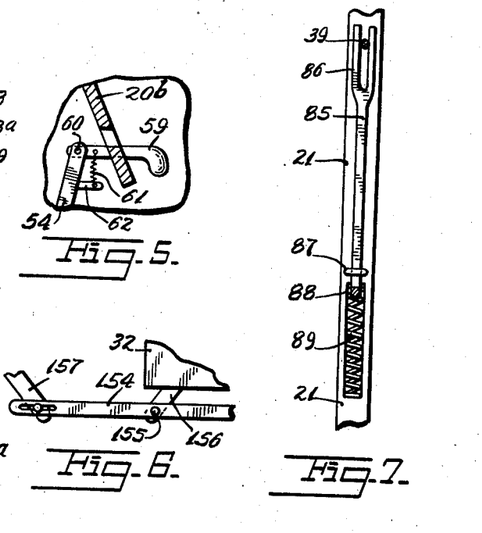
Fig. 5 is a fragmentary vertical sectional view taken on the line 5—5 of Fig. 4.
Fig. 6 is a fragmentary enlarged detailed view of the lower portion of Fig. 1.
Fig. 7 is a fragmentary vertical sectional view taken on the line 7—7 of Fig. 2.

The stop finger 52 may be locked in an operative position or may be manually moved to an inoperative position by a control rod 54 (see Fig. 4). The bottom end of this control rod extends between a fork 55 on the rear of the stop finger 52. The control rod extends upwards through a slot 56 in the floor 20ᵃ and intermediate of its ends is pivotally supported by a pintle 57 on a bracket 58 mounted on a portion of the automobile 20. The top end of the control rod 54 extends to a position immediately behind the dashboard 20ᵇ of the automobile 20.

A lever 59 is pivotally supported on the upper end of the control rod 54 by a pintle 60. A spring 61 is connected with the lever 59 and with a pin 62 mounted on the control rod 54. The front end of the lever 59 extends out of an arcuate slot 63 formed in the dashboard 20ᵇ. This slot 63 has a downwardly extending portion 63ᵃ at one end into which the lever 59 may engage for holding the control rod 54 locked in a position in which the stop finger 52 is held fixedly in the position illustrated in Fig. 11. In this condition the stop finger 52 is inoperative. To place the stop finger into operation it is required that the lever 59 be raised and allowed to enter the near end of the slot 63.

There is a small space 64 between the stop finger 52 and the edge of the cam portion 21. When the lever 59 is lifted out of the downward extending end 63ᵃ of the slot 63, the spring 54 will move the stop finger 52 so that it engages against the side edge of the cam 21. In this condition the stop finger 52 is "set," that is, it is operative awaiting the opportunity to engage over the shoulder 21ᶜᶜ of the cam 21ᶜ when the actuating rod is depressed to its initial condition.

At this point the motor of the vehicle is idling, the automobile is stationary with the brakes on. The braking control mechanism includes a lever 65 which is pivotally supported intermediate of its ends by a pintle 66 mounted on the casing 32. The end 65ᵃ of the lever 65 connects with a cable 67 which extends over a guiding pulley 68 and then through a guide tube 69 to the brake mechanism of the automobile. The lever 65 has another end 65ᵇ which supports a block 70 slidably mounted in a slot 71 of a lever 72 supported on the actuating rod 21. This lever 72 has a short slot 73 through which a support pin 74 passes. This pin 74 is mounted on the actuating rod 21. A spring 75 is interposed between the block 70 and the bottom end of the slot 71.

Figure 1:
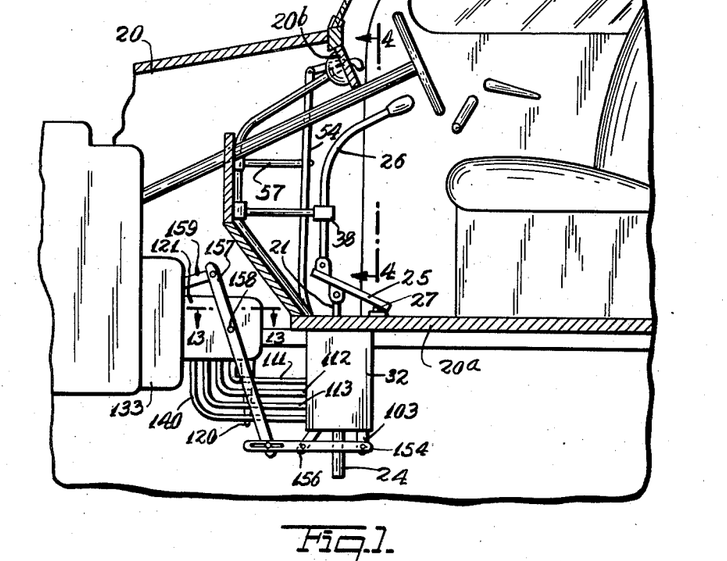
Fig. 1 is a fragmentary longitudinal sectional view of an automobile equipped with a remote control device constructed according to this invention.
Figure 2:
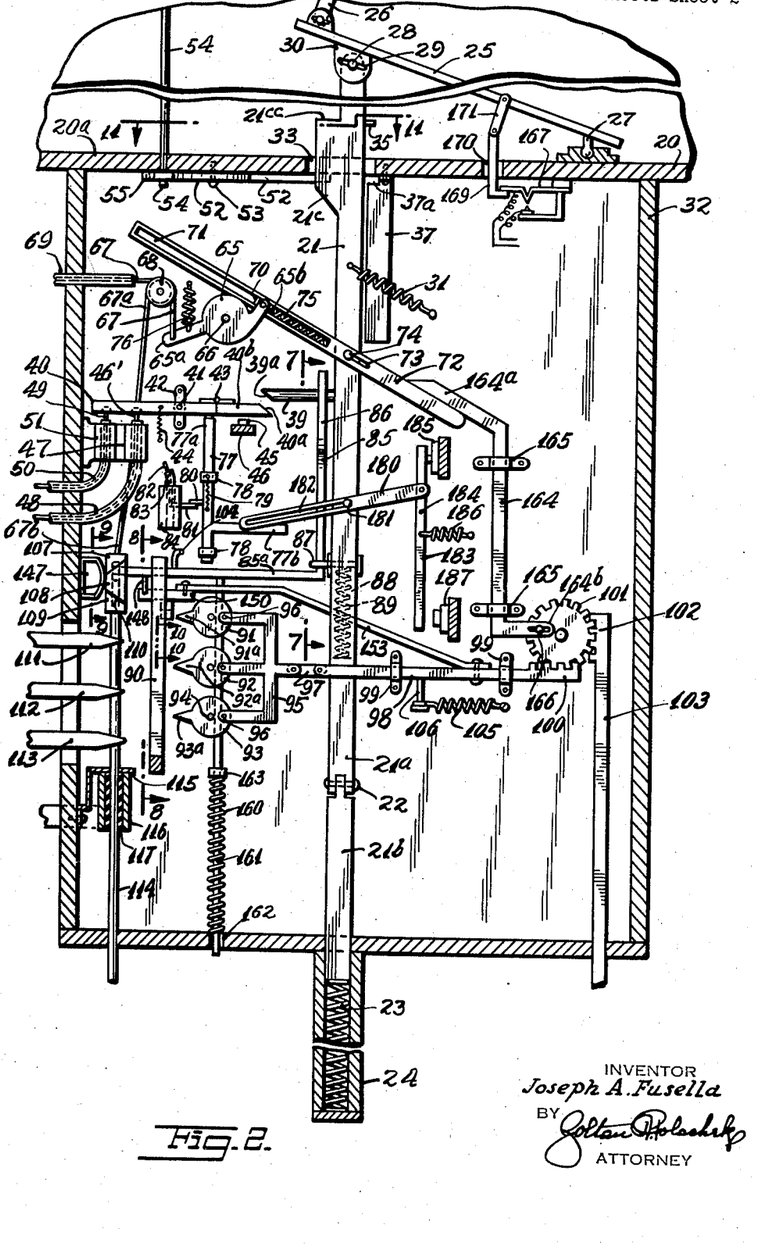
Fig. 2 is a fragmentary enlarged vertical sectional view through the main portion of the remote control apparatus.

In the condition of the parts shown in Fig. 2, the brakes are applied. This is accomplished by reason of the fact that the pin 74 is resting against the top end of the slot 73 holding the lever 72 in a raised position in which the spring 75 is compressed, urging the block 70 in a direction to pivot the lever 65 anticlockwise. In this position the lever 65 is stretching a brake releasing spring 76. This spring 76 is connected between the lever end 65ᵃ and the casing 32.

When the actuating rod 21 moves down to its initially depressed position the spring 75 will expand, losing some of its tension, but maintaining sufficient tension so as to still hold the lever 65 in the position shown in Fig. 2 with the brake applied. However, when the actuating rod 21 is depressed further than its initial position, as hereinafter more fully described, the spring 75 will lose its tension, and the block 70 will move out of contact with the spring 75 (see Fig. 3) so that the spring 76 pivots the lever 65, slackening the cable 68 and releasing the brakes.

The accelerator of the motor of the automobile is controlled by a member 77 which is vertically slidably supported in standards 78. The top end 77ᵃ of the member 77 is in intimate contact with the lever 40. A spring 79 is connected between the member 77 and one of the standards 78 for normally urging the member 77 into this raised position. The member 77 has a projection 80 abutting a projection 81 connected with a cable 82 housed in a guide tube 83 suitably supported in a block 84. The cable 82 is intended to be connected with the accelerator of the automobile. The arrangement is such that when the member 77 is depressed the cable 82 will be drawn accelerating the automobile motor. It is advisable that the parts be so arranged that normally the accelerator is half on. When the pawl 39 strikes the lever 40 the member 77 will be depressed so as to supply additional gasoline required in starting the motor. The member 77 also has a lateral projection 77ᵇ adapted to be engaged by the pawl 39 in the fully depressed condition of the actuating rod 21 to accelerate the automobile in third speed as will hereinafter be more fully described.

The means for operating the clutch system of the automobile includes a member 85 having a forked top end 86 between the fingers of which, the pawl 39 engages. After the actuating rod 21 has been depressed a certain amount, the pawl 39 will strike the base of the fork and start moving the member 85 downwards. This is for the purpose of operating the shift. The member 85 is slidably supported in a resiliently supported bracket 87 mounted on the actuating rod 21. This bracket 87 extends through a slot 88 formed in the actuating rod 21.

Figures 8, 9:
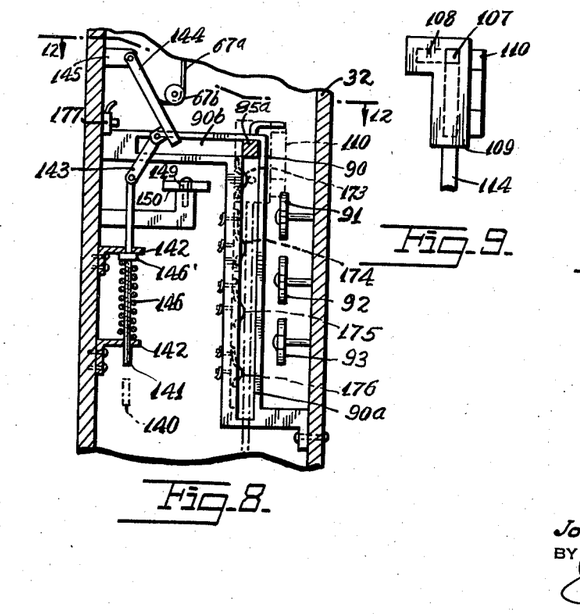
Fig. 8 is a fragmentary vertical sectional view taken on the line 8—8 of Fig. 2.
Fig. 9 is a fragmentary elevational view looking in the direction of the line 9—9 of Fig. 2.

A spring 89 is disposed within this slot and acts between the base of the slot and the bracket 87 for normally urging the bracket into its top position. The member 85 has an offset end 85ᵃ which extends through an inverted L-shaped guide bracket 90. This guide bracket 90 has a vertical slotted portion 90ᵃ and a horizontal slotted portion 90ᵇ (see Fig. 8). The member 85 at this point is capable of moving downwards, or laterally. At this point the shift of the automobile is in neutral.

A mechanism will now be described which will function to declutch the automobile, shift to first, then declutch, shift to second, and finally declutch and shift to third. This mechanism is characterized by a group of three wheels, 91, 92 and 93, each pivotally supported by a central pin 94. Each wheel has a projection; the wheel 91 has a projection 91ᵃ, the wheel 92 has a projection 92ᵃ, and the wheel 93 has a projection 93ᵃ. A bracket 95 has a plurality of horizontally projecting portions pivotally connected by pintles 96 with the wheels 91, 92 and 93. The bracket 95 is pivotally connected with a link 97, which in turn is pivotally connected with a rod 98 which is slidably supported in brackets 99. The remote end of the rod 98 has a rack portion 100 which meshes with a toothed wheel 101. The toothed wheel 101 engages a rack 102 which connects with a rod 103, which in turn is adapted to connect with the depressible rod which declutches the conventional clutch of an automobile.

A finger 104 projects from the portion 85ᵃ of the member 85 and is arranged at a position so as to successively strike the projections 91ᵃ, 92ᵃ and 93ᵃ, as the member 85 is moved downwards.

As the finger 104 so strikes the projections the wheels 91, 92 and 93 will be slightly angularly turned and this motion will be transmitted to move the rod 103 downwards which accomplishes the declutching. When the finger 104 rides free of one of the projections, a spring 105 returns the parts to their original positions. This spring 105 is connected between a pin 106 mounted on the rod 98 and the casing 32.

The free end of the portion 85ᵃ of the member 85 is provided with a head 107 which is slidably mounted in a slot 108 formed in a block 109. Normally, the head 107 is in the top of the slot 108. This block 109 has a cam 110 mounted on one side. The cam 110 is adapted to selectively engage the ends of levers 111, 112 and 113. These levers control shifting to first, second and third, respectively, as hereinafter more fully described. The block 109 is mounted on the top end of a rod 114. This rod passes through a bracket 115. The bracket 115 has a tubular member 116 mounted thereon. This tubular member has an oval shaped opening which is lined with friction material 117. The friction material 117 engages the rod 114 for frictionally holding the rod in the various positions into which it is forced.

Figure 14:
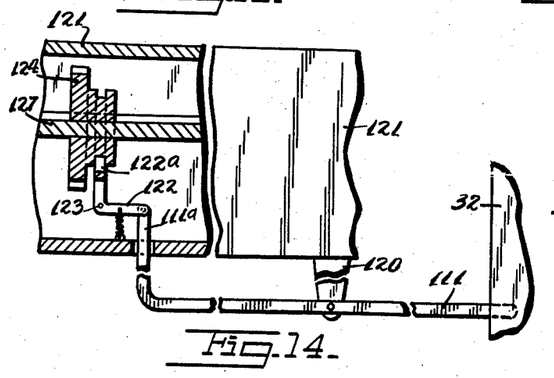
Fig. 14 is a fragmentary vertical sectional view taken on the line 14—14 of Fig. 13 and showing a few additional parts not shown in Fig. 13.
Figure 15:
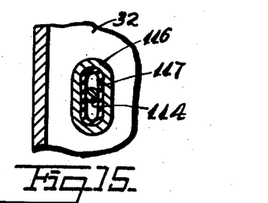
Fig. 15 is a horizontal sectional view on the line 15—15 of Fig. 3.
Figure 16:
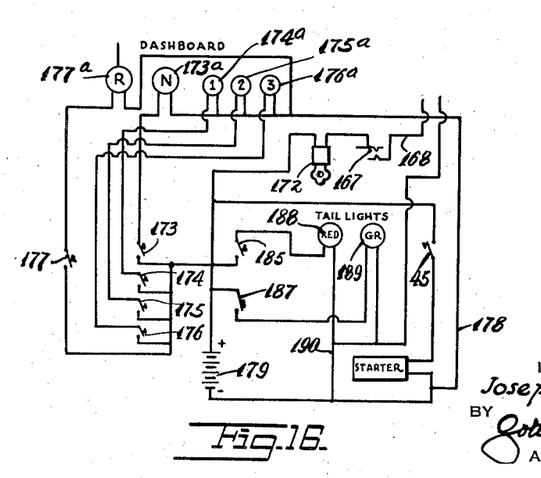
Fig. 16 is a schematic wiring diagram of the device.

The rods 111, 112 and 113 are pivotally supported intermediate of their ends on a lug 120 mounted upon the bottom of the housing 121 which contains the shift mechanism. The remote ends of the rods 111, 112 and 113 have upwardly extending portions similar to the portion 111ᵃ of the rod 111 illustrated in Fig. 14. These upwardly extending portions pivotally connect with one of the ends of bell cranks 122. The bell cranks are pivotally supported intermediate of their ends by pintles 123. The free ends of the bell cranks are provided with forks 122ᵃ which engage grooved collars on the shift gears.

There is a shift gear 124 for first; a gear 125 for second, and gear 126 for third. These gears are slidably mounted on the transmission shaft 127. This transmission shaft is located between two countershafts 128 and 129. The countershafts are driven by gears 130 which mesh with a gear 131 on the shaft 132 which comes from the clutch 133 of the automobile. The shaft 129 is the reverse countershaft. It is provided with the reverse gear 134 engageable by the reverse shiftable gear 135 on the shaft 127. The countershaft 128 is provided with the gears 136, 137 and 138 which are the complements for the shift gears 124, 125 and 126.

The reverse shift gear 135 is actuated by the rod 140. This rod 140 is pivotally mounted intermediate of its ends on the bracket 120. One end of the rod 140 extends into the casing 32 and is located directly beneath a rod 141. This rod 141 is slidably mounted in standards 142. Its upper end pivotally connects with a link 143, which in turn is pivotally connected with a lever 144. This lever 144 is pivotally supported on its top end on a lug 145. The bottom end of the lever 144 is disposed in the path of motion of the portion 85ᵃ of the member 85 when the actuating rod section 21ᵃ is moved laterally.

A cable 67ᵃ is connected with the lever 144 and engages over a guide pulley 67ᵇ and extends upwards over the pulley 68 and connects with the cable 67. The arrangement is such that when the lever 144 is being moved by the portion 85, the cable 67ᵃ is pulled, which pulls on the cable 67 in a manner to pivot the lever 65 slightly clockwise, compressing the spring 75 a small extent for releasing the brake.

A spring 146 is arranged coaxially on the rod 141 and acts between one of the standards 142 and a collar 146' mounted on the rod 141 for normally urging the rod upwards. This spring 146 is very weak so as to be incapable of moving the block 109 laterally.

The block 109 has a lateral groove connecting with the groove 108. The head 107 may also move in this lateral groove. A spring or other friction member 147 is mounted on the casing 32 and frictionally engages the side of the block 109 for holding the block frictionally in various positions in which it may be set. A finger 148 projects from the member portion 85ᵃ and is arranged to strike a projection 149 on a wheel 150 pivotally supported by a pintle 151 on a bracket 152. This wheel has an arm 153 pivotally connected with it and connected with the rod 98. When the wheel 150 is pivoted in one direction or the other by the finger 148 striking the projection 149, the arm 153 will communicate the motion to the rod 98 to operate the clutch rod 103.

The clutch rod 103 comes out from the bottom of the casing 32 and pivotally connects with a lever 154. This lever is pivotally supported by a pintle 155 on a bracket 156 mounted on the bottom of the casing 32. The other end of the lever 154 pivotally connects with one end of a lever 157 which is pivotally supported intermediate of its ends by a pintle 158 mounted on the side of the shift housing 121. The upper end of the lever 157 pivotally connects with the depressible clutch rod 159 of the clutch 133.

The member 85 is normally urged into a raised position by a spring 160. This spring is coaxially mounted on a rod 161 which is slidably supported by engaging through an aperture 162 in the casing 32. The spring 160 is coaxial on this rod and acts between the casing 32 and a collar 163 mounted on the rod 161.

An arm 164 is slidably supported in brackets 165 mounted on the casing 32. This arm has a head portion 164ᵃ engageable by the tail end of the rod 72. The lower end of the arm 164 has an offset portion 164ᵇ which is eccentrically connected by a pin 166 with the toothed wheel 101. When the actuating rod 21 is in its completely raised position the rod 72 engages the end 164ᵃ of the arm 164 and holds the toothed wheel 101 in a position in which the rod 103 is lowered. In this position the automobile is declutched.

A means is provided for breaking the ignition circuit when the actuating rod 21 is in its completely raised position. This means includes a switch 167 arranged in the ignition circuit 168 and controlled by an arm 169 slidably engaged through an opening 170 in the floor 20ᵃ and connected by a link 171 with the pedal 25. When the pedal 25 is in its completely raised position the arm 169 holds the spring 167 in an open position as illustrated in Fig. 2. When the arm 25 is but slightly lowered the switch 167 will close and the ignition circuit is ready to function provided, however, that the ignition lock 172 is turned on.

A signal system is provided for indicating whether the shift is in neutral, first, second, third, or reverse speeds. This signal system includes a switch 173 to indicate neutral; a switch 174 to indicate first, switch 175 to indicate second, and switch 176 to indicate third. These four switches are mounted upon the bracket 90 (see Fig. 8). In the neutral position of the member 85 the switch 173 is closed. These four switches are wired up with lamps or other indicating devices on the dashboard 20ᵇ. The neutral switch 173 is wired with a neutral indication 173ᵃ. First speed is wired up with indication 174ᵃ; second speed 175ᵃ, and third speed 176ᵃ. There is also a reverse speed switch 177 contactable by the lever 174 (see Fig. 8), when the shift is in reverse. This switch 177 is wired up with a reverse speed indicator 177ᵃ. The switches 173—177 inclusive are in a circuit 178 connected with a battery 179.

The signal system also includes an indication for forward motion and "stopping" of the automobile. This is controlled by a lever 180 supported by a pin 181 mounted on the actuating rod 21. This pin 181 engages in a slot 182 formed in the lever 180. The lever 180 is pivotally connected with a control lever 183. This control lever is pivotally supported by a pintle 184. In the completely raised position of the actuating rod 21 the pin 181 strikes the end of the slot 182 and forces the upper end of the control lever 183 against a switch 185 for closing this switch. A spring 186 is connected with the control lever 183 and with the casing 32 and normally acts to pivot the control lever 183 into a position in which the switch 185 is open, and in which another switch 187 is closed. This switch 187 is located adjacent the opposite end of the lever 183. The switch 185 is arranged in a circuit which includes a red signal 188, while the switch 187 is arranged in a circuit including a green signal 189. These signals are arranged in the circuit 190 which includes the battery 179.

Figure 10:
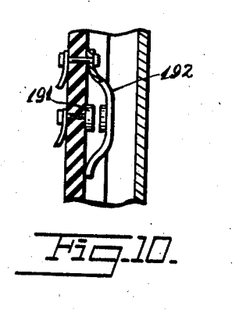
Fig. 10 is a fragmentary enlarged vertical sectional view taken on the line 10—10 of Fig. 2.

In Fig. 10 a detail of one of the switches on the bracket 90 has been disclosed so that the operation of the switch may be understood. The switch comprises a stationary contact 191 opposed by a resilient contact 192. This resilient contact is arranged in the path of motion of the member portion 85ᵃ so that the contacts engage each other in a certain position of the member portion.

The operation of the device is as follows:

With the parts as illustrated in Fig. 2 the automobile is at rest with the brakes on and the motor off. The automobile may be started merely by depressing the foot pedal 25. For convenience, both feet may be placed on this pedal, or the pedal may be controlled by the handle lever 26.

The ignition switch 172 must be turned on. Then the pedal 25 is slightly depressed so that the arm 169 disengages from the switch 167. This switch closes and the ignition circuit is now closed. The pedal 25 is further depressed so that the actuating rod 21 moves down a slight distance so that the pintle 39 engages the lever 40, pivoting this lever about the point 41 and causing the lever to close the self-starter switch 45 and simultaneously draw the wires 46 and 49 for advancing the spark and opening the choke. The member 77 is also depressed by the lever 40 for turning on the accelerator to a greater extent. The motor now starts and the pawl 39 passes the lever 40, dropping the lever.

The lever 40 is returned to its initial position by the spring 44. This opens the starter switch 45 and sets the spark advance and choke back into their driving positions. The member 77 also moves to its raised position so that the accelerator moves back to its normal operating position. The automobile motor is now idling. By this time the actuating rod 21 has been depressed to a position in which the shoulder 21ᶜ is immediately adjacent the stop finger 52. This stop finger then snaps into a position over the shoulder 21ᶜᶜ holding the actuating rod 21 in this initially depressed position. However, for proper operation of the stop finger 52 it is required that the holding means of this stop finger be released by lifting up the lever 59 and allowing the lever 59 to move slightly into the slot 63 on the dashboard. The motor is now idling and the car still has its brakes on.

The driver may release all pressure on the actuating rod 21 which will be held down by the stop finger 52 so that the motor may heat up. To drive the car it is merely necessary that the actuating rod 21 be further depressed. A position will soon be reached in which the spring 75 releases the block 70 so that the spring 76 slackens the control wire 67 of the brakes of the automobile. At about this time the finger 104 strikes the projections 91ᵃ of the wheel 91, pivoting the wheel and through the bracket 95, link 97, rod 98, etc., depresses the clutch rod 159 for declutching the clutch. Immediately, when this is accomplished the cam 110 will strike the lever 111, pivoting this end of the lever downwards. This functions through the system illustrated in Fig. 14 to move the shift gear 124, shifting the car into first. When this is done the finger 104 drops the projection 91ᵃ. The spring 105 returns the wheel 91 to its original position which causes engagement of the clutch. The cam 110 now holds the rod 111 and the car is operating in first speed.

Figure 3:
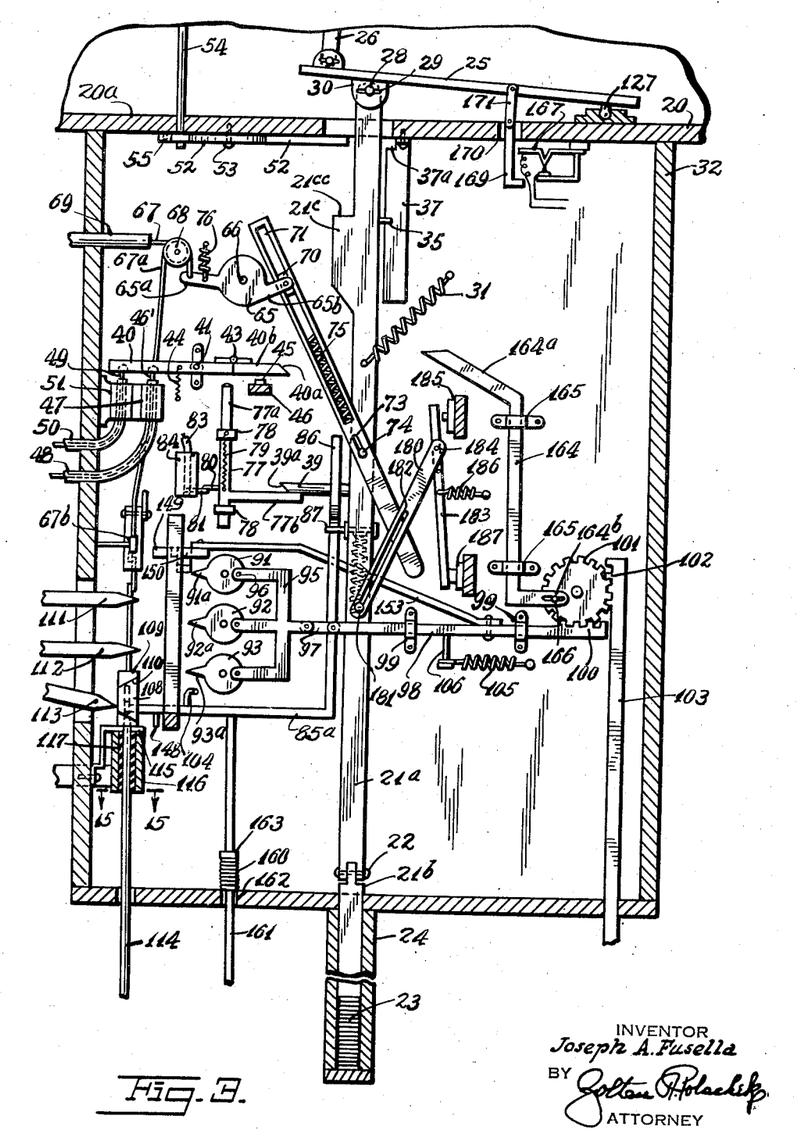
Fig. 3 is a sectional view similar to Fig. 2 but illustrated with the actuating rod completely depressed.

Further downward motion of the actuating rod 21 will cause the finger 104 to strike the projection 92ᵃ of the wheel 92 pivoting the wheel, and through the medium of the bracket 95, the link 97, etc., causes the depression of the clutch rod 159, declutching. At this instant the cam 110 drops the lever 111 which snaps back to its original position, shifting out of first. Instantly, the cam 110 engages the lever 112 pivoting the same and causing a shift into second. Then the finger 104 drops the projection 92ᵃ which indirectly causes the engagement of the clutch. The car is now operating in second. Further depression of the actuating rod 21 will cause the finger 104 to engage the projection 93ᵃ of the wheel 93, declutching, then the cam 110 will act to drop the lever 112, and to depress the lever 113 to cause a shift into third. The parts in this condition are illustrated in Fig. 3. The car is now operating in third. The accelerator is controlled by the pawl 39 striking the projecting portion 77ᵇ of the accelerator control member 77. This member is indirectly operating the control wire 82.

To bring the car to a stop it is merely necessary to release the actuating rod 21, which then rises to its initially depressed position in which the shoulder 21ᶜᶜ strikes the stop finger 52. During the period that the actuating rod 21 raises, the car will successively be shifted from third to second and then to first, and then into neutral. It should be noted that there is a certain drag between the member 85 and the block 109 which is necessary to properly accomplish shifting in the reverse order. This may be understood by considering Fig. 3.

As the actuating rod 21 moves upwards the block 108 will maintain its fully lowered position because of the friction material 117 acting against the rod 114 which is connected with the block 109. However, a position will soon be reached where the finger 104 strikes the projection 93ᵃ to cause declutching. At this point the loose motion of the connection between the member 85a and the block 109 will have been taken up, that is, the head 107 has reached the top of the slot 108. Now the block 109 is being raised and soon the cam 110 drops the lever 113 causing third gear to disconnect. The cam then engages the lever 112 to cause a shift into second. At this instant the finger 104 drops the projection 93a and the automobile is operating in second. In this manner the operation is continued into first, and then into neutral. The parts are now in their original, initial depressed condition of the actuating rod 21.

At this point it is possible to drive the car in reverse merely by moving the upper section 21a of the actuating rod laterally. This is done by forcing the foot pedal 25 laterally, or the hand lever 26. The section 21a of the actuating rod need but move a small amount and there is enough tolerance between the actuating rod and the parts carried by it to permit such lateral motion. Lateral motion of the actuating rod section 21a causes the member 85 to travel along the opening 90b of the bracket 90. The finger 148 first engages the projection 149 of the wheel 150 which indirectly causes depression of the clutch rod 159, declutching. At this point the portion 85a engages the lever 144 which indirectly lowers the rod 141 which strikes the reverse shift control rod 140 causing a shift into reverse. Simultaneously, motion of the lever 144 is communicated by the cable 67a to pivot the lever 65, slackening the cable 67 and so releasing the brake.

The finger 148 then drops off the projection 149 and the clutch is indirectly set into operation. The car is now in reverse. The car is taken out of reverse by moving the actuating rod section 21a back to its original position. The friction spring 147 retards the block 109 so that the finger 148 has an opportunity to first engage the projection 149 to cause declutching before the block 109 releases the lever 144 to cause shifting out of reverse and applying the brakes. After declutching out of reverse is accomplished, and the brakes are applied, the projection 149 is dropped so that the clutch engages. However, the car is now in neutral with the brakes on, and not in motion.

The automobile may be completely stopped, including the motor, by pressing the lever 59 into the offset portion 63a of the slot 63 any time during the operation of the automobile. When this is done the stop finger 52 will be moved to its inoperative position illustrated in Fig. 11. Now when the actuating rod 21 is released it will come to its fully raised position. This will cause the engagement of the arm 169 with the switch 167 to break the ignition circuit. The motor stops. The ignition lock 172 may now be turned off.

It is believed that the functioning of the signal system is obvious from the previous disclosure of the location of the switches and the operation of the device.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, and means for operating said clutch system, speed shift system and brake system on lateral motion of said actuating rod section for driving said automobile in reverse and stopping when said actuating rod again reaches said initial depressed position.

2. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and a foot pedal for controlling said actuating rod.

3. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and a hand lever for controlling said actuating rod.

4. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, a spring being connected with said actuating rod for providing for the resilient upward urge thereof.

5. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, and means for operating said clutch system, speed shift system and brake system on lateral motion of said actuating rod section for driving said automobile in reverse and stopping when said actuating rod again reaches said initial depressed position, said means for starting the motor including a pawl mounted on the actuating rod and engageable with a lever controlling a starter switch.

6. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, and means for operating said clutch system, speed shift system and brake system on lateral motion of said actuating rod section for driving said automobile in reverse and stopping when said actuating rod again reaches said initial depressed position, said means for starting the motor including a pawl mounted on the actuating rod and engageable with a lever controlling a starter switch, and a spark advance and choke control.

7. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, and means for operating said clutch system, speed shift system and brake system on lateral motion of said actuating rod section for driving said automobile in reverse and stopping when said actuating rod again reaches said initial depressed position, said means for starting the motor including a pawl mounted on the actuating rod and engageable with a lever controlling a starter switch, and a spark advance and choke control, and an accelerator control.

8. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, and means for operating said clutch system, speed shift system and brake system on lateral motion of said actuating rod section for driving said automobile in reverse and stopping when said actuating rod again reaches said initial depressed position, said means for operating the clutch system and shift system includes a plurality of wheels pivotally mounted and having projections, and connected to declutch when pivoted in either direction.

9. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, and means for operating said clutch system, speed shift system and brake system on lateral mortion of said actuating rod section for driving said automobile in reverse and stopping when said actuating rod again reaches said initial depressed position, said means for operating the clutch system and shift system includes a plurality of wheels pivotally mounted and having projections, and connected to declutch when pivoted in either direction, and a finger engageable with said projections mounted on a member indirectly controlled by said actuating rod.

10. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, and means for operating said clutch system, speed shift system and brake system on lateral motion of said actuating rod section for driving said automobile in reverse and stopping when said actuating rod again reaches said initial depressed position, including a finger indirectly operable by said actuating rod and controlling a wheel arranged to move and operate declutching mechanism.

11. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and releasable means for limiting upward motion of said actuating rod to said initial depressed position.

12. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and releasable means for limiting upward motion of said actuating rod to said initial depressed position, including a lever engageable with a slot and an offset slot portion on the dashboard and releasable therefrom.

13. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and releasable means for limiting upward motion of said actuating rod to said initial depressed position, including a lever engageable with a slot and an offset slot portion on the dashboard and releasable therefrom, said lever controlling a pivotally mounted arm, in turn controlling a stop finger.

14. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and means for breaking the ignition circuit when the actuating rod is in its completely raised position.

15. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and means for breaking the ignition circuit when the actuating rod is in its completely raised position, including a switch in the ignition circuit and means for opening said switch controlled by an arm indirectly connected with said actuating rod.

16. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and a signal system for indicating whether the shift is in neutral, first, second, third, or reverse.

17. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and a signal system for indicating whether the shift is in neutral, first, second, third, or reverse, and forward motion and stopping of said automobile.

18. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and a signal system for indicating whether the shift is in neutral, first, second, third, or reverse, and forward motion and stopping of said automobile, said forward motion and signal and stopping signal of the automobile being indirectly controlled by a pivotally mounted control lever actuated indirectly by said actuating rod.

19. In combination with an automobile having a motor with an ignition system and an accelerator, and also having a brake system, clutch system, and speed shift system, a manually depressible actuating rod resiliently urged upwards, and having a section capable of bending laterally, means for starting said motor in an initial depressed position of said actuating rod, means for operating said clutch system, speed shift system and brake system on further depression of said actuating rod to shift from neutral into first, second and third for driving said automobile at various speeds and stopping same when said actuating rod again reaches said initial depressed position, means for operating said clutch system, speed shift system and brake system on lateral motion of said actuating rod section for driving said automobile in reverse and stopping when said actuating rod again reaches said initial depressed position, and a signal system for indicating whether the shift is in neutral, first, second, third, or reverse, and forward motion and stopping of said automobile, said forward motion and signal and stopping signal of the automobile being indirectly controlled by a pivotally mounted control lever actuated indirectly by said actuating rod, said lever being adapted to operate one switch or another switch depending on its position.

JOSEPH A. FUSELLA.